(12) United States Patent
Ghosh

(10) Patent No.: US 12,510,433 B2
(45) Date of Patent: Dec. 30, 2025

(54) LEAK DETECTION SYSTEM INCLUDING PHOTO IONIZATION DETECTOR

(71) Applicant: GM GLOBAL TECHNOLOGY OPERATIONS LLC, Detroit, MI (US)

(72) Inventor: Ranajit Ghosh, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 431 days.

(21) Appl. No.: 18/114,561

(22) Filed: Feb. 27, 2023

(65) Prior Publication Data

US 2024/0288330 A1    Aug. 29, 2024

(51) Int. Cl.
*G01M 3/20* (2006.01)

(52) U.S. Cl.
CPC ................... *G01M 3/20* (2013.01)

(58) Field of Classification Search
CPC ......... G01M 3/20; G01M 3/205; G01M 3/229
See application file for complete search history.

(56) References Cited

U.S. PATENT DOCUMENTS

| | | | | |
|---|---|---|---|---|
| 5,373,729 A | * | 12/1994 | Seigeot | G01M 3/227 73/49.3 |
| 6,450,012 B1 | * | 9/2002 | Mayer | G01M 3/227 73/49.3 |
| 7,905,132 B1 | * | 3/2011 | Chamberlain | G01M 3/205 73/40.7 |
| 2021/0396622 A1 | * | 12/2021 | Bright | G01M 3/04 |

* cited by examiner

*Primary Examiner* — David Z Huang

(57) ABSTRACT

A leak detection system includes a chamber support including a chamber supported by a frame. A trace gas supply supplies a trace gas mixture to a first volume defined between the chamber and a test part. A test part support includes an adapter supported by a frame and configured to mate with the test part and to define a second volume between the test part and the adapter. A seal plate surrounds the adapter and seals with the chamber. One or more inlets are in fluid communication with the second volume. N outlets are in fluid communication with the second volume. N fans create a second vacuum pressure in the second volume, supply gas to the one or more inlets and receive gas from a respective one of the N outlets. N gas sensors sense trace gas in the gas received from a respective one of the N outlets.

20 Claims, 3 Drawing Sheets

LEAK DETECTION SYSTEM INCLUDING PHOTO IONIZATION DETECTOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to leak detection systems, and more particularly to leak detection systems using photo ionization detector sensors.

Vehicles include large parts such as a battery pack, drive unit, engine components and assembly, or other parts that need to be leak resistant or leak proof. For example, battery electric vehicles include a battery module or battery pack including a large battery tray and cover. The battery tray and cover need to be leak resistant or leak proof. It is difficult to test for leakage of the battery tray and cover (or other large housing and/or other component) due to their large sizes.

SUMMARY

A leak detection system includes a chamber support including a frame, a chamber supported by the frame, and a trace gas supply configured to supply a trace gas mixture to a first volume defined between the chamber and a first side of a test part. A test part support includes a frame, an adapter supported by the frame and configured to mate with a second side of the test part and to define a second volume between a second side of the test part and the adapter, and a seal plate surrounding the adapter and configured to seal with the chamber. One or more inlets are in fluid communication with the second volume. N outlets are in fluid communication with the second volume, where N is an integer greater than one. N fans are configured to create a second vacuum pressure in the second volume, to supply gas to the one or more inlets, and to receive gas from a respective one of the N outlets. N gas sensors are configured to sense trace gas in the gas received from a respective one of the N outlets.

In other features, the chamber support comprises one or more fans configured to create a first vacuum pressure in the first volume and to circulate the trace gas mixture within the first volume. The second vacuum pressure in the second volume is lower than the first vacuum pressure in the first volume. The trace gas mixture comprises an organic trace gas and an inert gas. A gas sensor is configured to sense the trace gas mixture circulated in the first volume. The gas sensor comprises a photo ionization detector.

In other features, a controller is configured to detect a leak in one or more of N regions of the test part in response to outputs of the N gas sensors and to identify a location of one or more leaks relative to the N regions. The adapter is removably attached to the frame to allow replacement by another adapter for another test part having one or more dimensions that are different than the test part. The test part support includes wheels to allow the test part support to move reciprocally below the chamber support in a horizontal direction from a loading/unloading position to a testing position. The chamber support includes a position adjuster configured to reciprocally move the chamber in a vertical direction onto and off of the test part support.

A method for detecting leaks in a test part includes arranging a test part on an adapter of a test part support; lowering a chamber mounted on a chamber support onto a seal plate of the test part support. A first volume is defined between a first side of the test part and the chamber and a second volume is defined between a second side of the test part and the adapter. The method includes creating a first vacuum pressure in the first volume; creating a second vacuum pressure in the second volume; supplying a trace gas mixture to the first volume; supplying gas to one or more inlets in fluid communication with the second volume; sampling gas from N outlets in fluid communication with the second volume, where N is an integer greater than one, using N gas sensors; and identifying one or more leaks in one or more of N regions of the test part in response to outputs from the N gas sensors.

In other features, the method includes circulating the trace gas mixture within the first volume. The second vacuum pressure is lower than the first vacuum pressure. The trace gas mixture comprises an organic trace gas and an inert gas. The method includes sensing the trace gas mixture circulated in the first volume. The sensing is performed using a photo ionization detector. The N gas sensors comprise photo ionization detectors.

In other features, the method includes removably attaching the adapter to a frame of the test part support to allow replacement of the adapter by another adapter configured for another test part having one or more dimensions different than the test part. The method includes reciprocally moving the test part support in a horizontal direction below the chamber support. The method includes reciprocally moving the chamber in a vertical direction onto the seal plate and off of the seal plate.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1B:
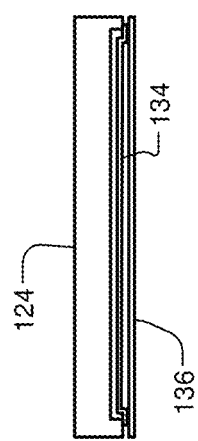
FIGS. 1A and 1B are a perspective view and a simplified partial cross sectional view, respectively, of an example of a leak detection system for a test part according to the present disclosure.

A leak detection system according to the present disclosure measure leak rate in a test part such as a battery cover, tray, housing, or other part and also determines a location of the leak in N regions of the test part, where N is an integer greater than one. The leak detection system supplies a trace gas mixture to a first volume defined between a chamber and one side of the test part. N gas sensors sense a tracer gas in a second volume inside of the test part. In some examples, the N gas sensors include photo ionization detectors (PIDs). In some examples, the leak detection system tests pressure decay and/or accumulation at multiple locations of the test part at the same time.

The leak detection system includes a chamber support including the chamber that surrounds the one side of the test part and a test part support with a frame, a seal plate and an adapter. The adapter provides a surface that mates with one side of the test part. In some examples, the adapter is detachable so that different types of test parts can be tested by replacing the adapter.

In some examples, the chamber support is configured to move the chamber reciprocally in a vertical direction to allow the test part support to be moved below the chamber support. For example, a slide and actuators can be used. In some examples, the chamber support includes another gas sensor to measure the concentration of the trace gas mixture supplied into the chamber. The chamber support also includes fans connected by one or more inlets and one or more outlets to the chamber.

After the test part is loaded onto the test part support, the test part support is shuttled from a loading/unloading position to a testing position below the chamber support. The test part support includes N gas sensing loops each including a gas sensor and a fan. The chamber is lowered by the chamber support onto the sealing plate to enclose the test part. Vacuum is pulled on both the chamber and the test part. In some examples, a pressure inside of the test part is maintained below the pressure in the chamber (e.g., 0.5 psi). The chamber is charged with a trace gas mixture and a gas such as air is circulated in the test part. In some examples, the trace gas mixture includes 3% organic trace gas (OTG) and 97% molecular nitrogen ($N_2$).

As trace gas leaks into the test part, the concentration of the trace gas inside of the test part slowly rises. The rate of rise of the concentration is directly proportional to the leakage rate. Air is circulated inside of the test part using the fans to ensure that all of the air in the test part passes by at least one of the gas sensors during the test. The trace gas mixture in the chamber is also circulated to ensure that all of the areas on the outer surface of the test part are exposed to the trace gas mixture.

The N gas sensors selectively identify a leak based on the sensed trace gas. The N gas sensors help to identify a location of the leak. For example when N is equal to 4, the location of the leak(s) can be associated with one or more quadrant(s) of the test part rather than the entire test part. When the test is over, the chamber is raised by the chamber support and the test part support is moved to the loading/unloading position. The test part is unloaded and the process is repeated.

Figure 1A:
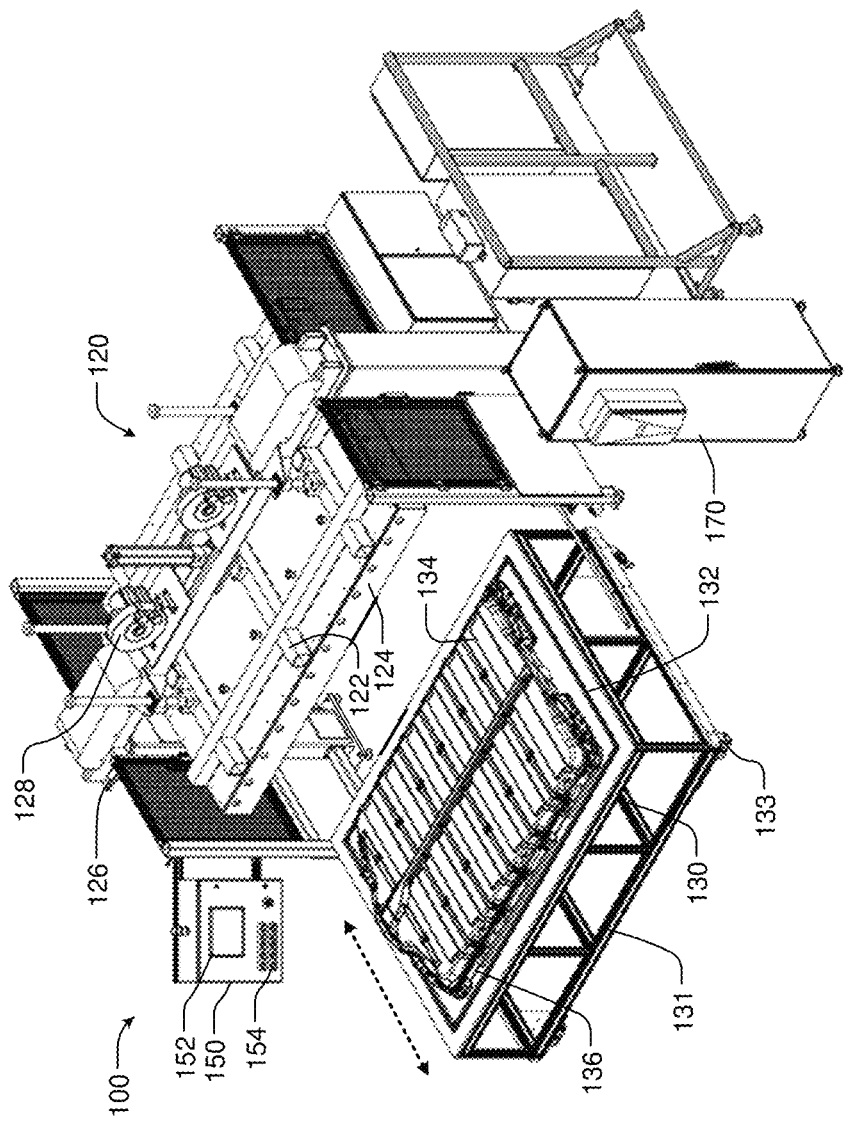

Referring now to FIGS. 1A and 1B, a leak detection system 100 for test part such as a tray, cover, housing, or other test part is shown. The leak detection system 100 includes a chamber support 120 including a frame 122, a chamber 124, a position adjuster 126 to adjust a position of the chamber 124, and one or more fans 128 configured to circulate the trace gas mixture and/or to create vacuum pressure in the chamber 124 during leak detection. A gas sensor (FIG. 3) senses a concentration of trace gas circulating between the chamber 124 and an upper side of a test part 134 (FIG. 1B).

A test part support 130 is configured to support the test part 134 such as a tray, cover, housing, or other part. In some examples, the test part support 130 includes a frame 131 and a position adjuster 133 such as wheels or slides to allow the test part support 130 to move relative to the chamber support 120. In other examples, the chamber support 120 moves relative to the test part support 130 and/or both move. The test part support 130 includes a seal plate 132 to seal with the chamber 124 and an adapter 136 configured to create a seal with a bottom side of the test part 134 (FIG. 1B).

The leak detection system 100 includes a control interface 150 configured to allow an operator to control test parameters of the leak detection system 100 such as the pressure difference, the vacuum levels in the test part 134 and the chamber 124, the duration of the test. The control interface 150 includes a display 152 and a user input device 154. The leak detection system 100 includes a data acquisition system 170 to record leak detection data from the gas sensors for each test part 134.

Figure 2:
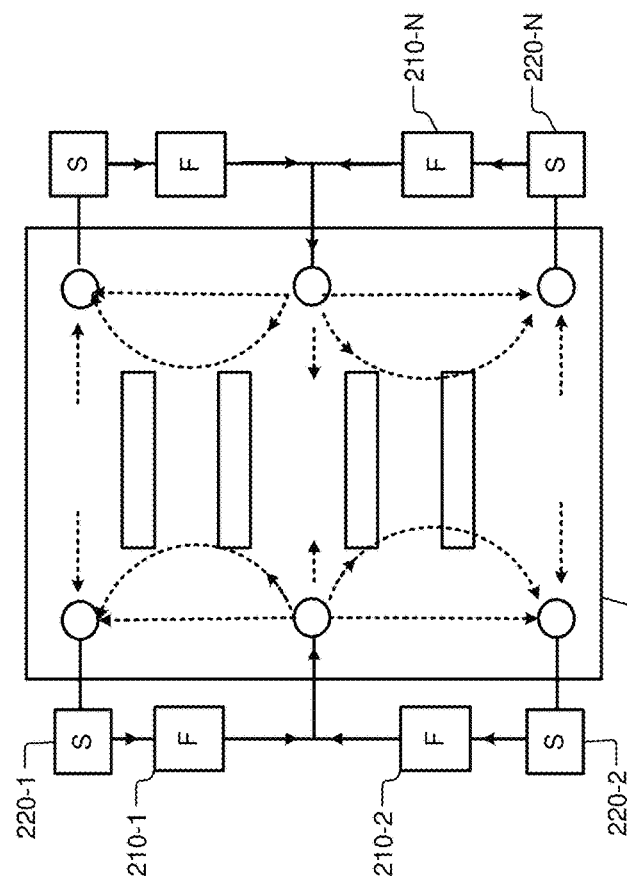
FIG. 2 is a schematic showing an example of air flow in the test part during testing.

Referring now to FIG. 2, air flow between a first side (e.g., inner surface) of the test part 134 and the adapter 136 is shown. N fans 210-1, 210-2, . . . , and 210-N direct air into outlets 212-1 and 212-2 that supply air between the first side of the test part and the adapter 136. In some examples, the outlets 212-1 and 212-2 are located at opposite sides and in a middle of the test part 134. N inlets 214-1, 214-2, . . . , and 214-N draw air from the first side of the test part 134. In some examples, the N inlets 214-1, 214-2, . . . , and 214-N are arranged in corners of the test part 134. Sensors 220-1, 220-2, . . . , 220-N sense the air drawn between the first side of the test part 134 and the adapter 136.

Figure 3:
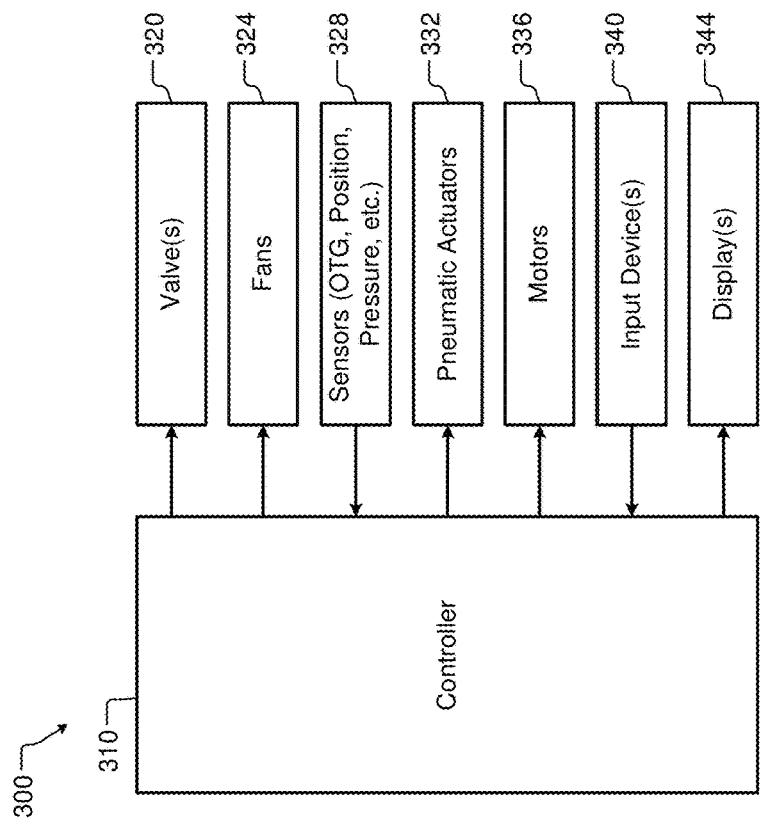
FIG. 3 is a functional block diagram of an example of a control system of the leak detection system according to the present disclosure.

Referring now to FIG. 3, a control system 300 for the leak detection system 100 is shown. A controller 310 is configured to control one or more valves 320 to selectively supply the trace gas mixture to the volume between the chamber 124 and a second side (e.g., an outer surface) of the test part 134 (e.g., when the test part is on the test part support 130 and the chamber 124 is seated on the seal plate 132).

The controller 310 is configured to control operation of the fans 324 (including fans 128 and 210) to control vacuum pressure in the chamber 124 and the test part 134, to circulate the trace gas mixture from a gas source through the chamber 124 and/or to circulate air through the test part 134. The controller 310 is configured to control sensors 328 (e.g., sensing gas in the test part 134 and the chamber 124), position sensors to sense positions (e.g., the chamber support and/or test part support, the test part on the adapter, etc.), pressure sensors (e.g., to sense pressure in the test part 134 and/or the chamber 124, etc.).

The controller 310 is configured to control actuators 332 such as pneumatic actuators and/or motors 336 to control movement of the test part support 130, the chamber support 120, and/or other components. The controller 310 receives input from input devices 340 such as the control interface 150 and provides outputs to displays 344.

After loading, the controller 310 is configured to move the test part support 130 and/or the chamber support 120 such that the test part 134 is arranged under the chamber 124. The controller 310 is configured to lower the chamber 124 onto the seal plate 132. The controller 310 is configured to draw a vacuum between the first side of the test part 134 and the adapter 136 and between the second side of the test part 134 and the chamber 124.

The controller 310 is configured to monitor the N gas sensors 220 for the trace gas over a predetermined test period. The controller 310 is configured to determine whether the test part 134 meets or fails the leak detection test in each of N regions of the test part 134 corresponding to the N gas sensors 220. Furthermore, the controller 310 is configured to identify a location or locations of the test part that failed the leak test.

Figure 4:
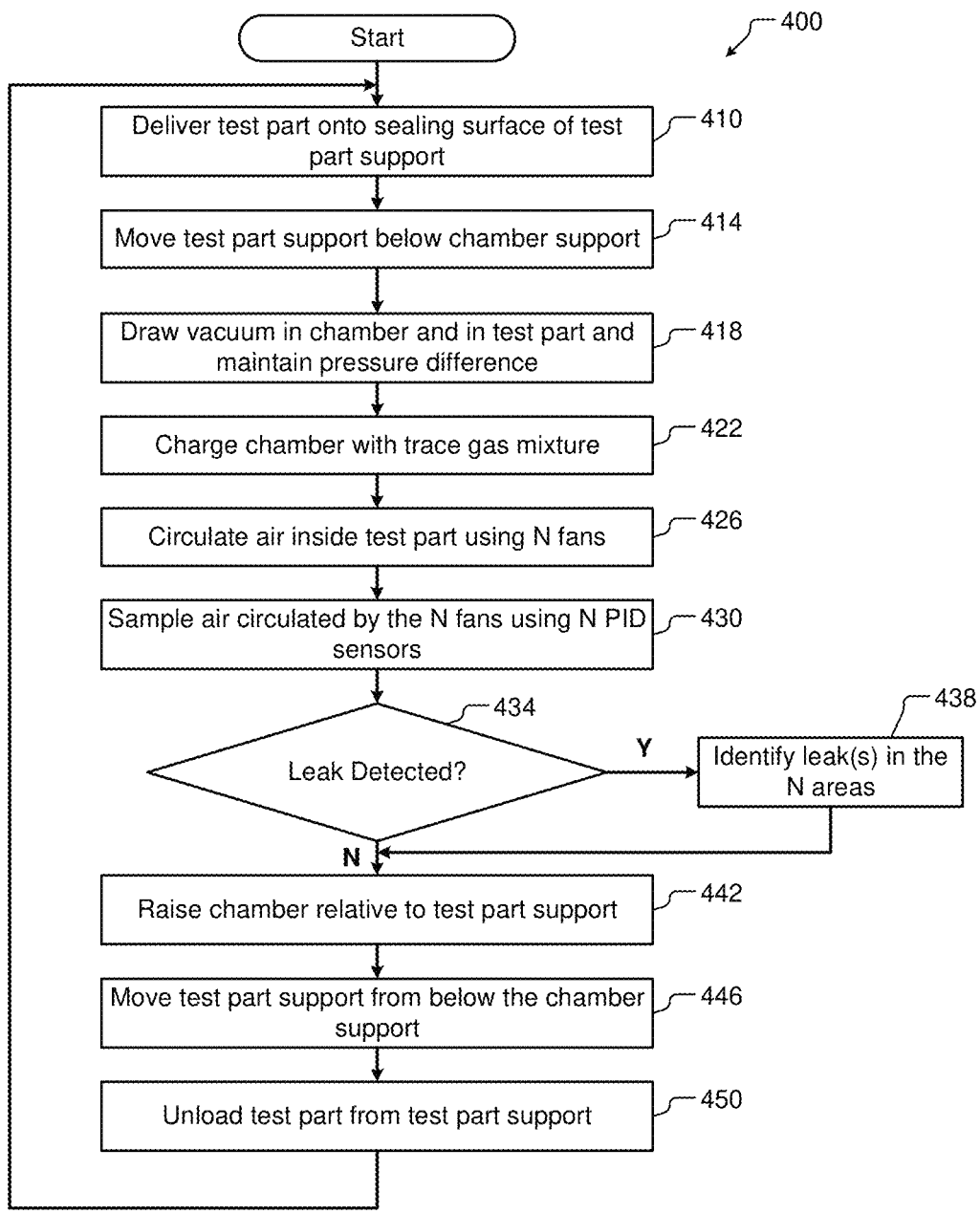
FIG. 4 is a flowchart of an example of a method for performing leak detection for the test part according to the present disclosure.

Referring now to FIG. 4, a method 400 for performing leak detection for the test part 134 is shown. At 410, the test part 134 is delivered onto the test part support 130. At 414, the test part support 130 and/or the chamber support 120 are repositioned such that the test part 134 is located under the chamber 124. At 418, vacuum is drawn between the first side of the test part 134 and the adapter 136 and between the second side of the test part 134 and the chamber 124. In some examples, a difference in pressure is created in the chamber 124 relative to the first surface of the part. In some examples, the pressure difference is in a range from 0.1 psi to 2 psi (e.g., 0.5 psi).

At 422, a trace gas mixture is supplied between the second side of the test part 134 and the chamber 124. At 426, air is circulated between the adapter 136 and the first side of the test part 134. At 430, the N gas sensors 220 sample the air drawn from corresponding ones of the N regions of the test part 134. If leak(s) are detected at 434, a leak is declared at 438 in one or more of the N regions.

The method continues from 434 (if false) or 438 and raises the chamber relative to the test part support at 442. At 446, the test part support and/or chamber support are moved such that the test part support is no longer under the chamber support and can be moved to the loading/unloading position. At 450, the test part is unloaded and the process repeats or ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A leak detection system comprising:
   a chamber support comprising:
      a first frame;
      a chamber supported by the first frame; and
      a trace gas supply configured to supply a trace gas mixture to a first volume defined between the chamber and a first side of a test part; and
   a test part support comprising:
      a second frame;
      an adapter supported by the second frame and configured to mate with a second side of the test part and to define a second volume between the second side of the test part and the adapter;
      a seal plate surrounding the adapter and configured to seal with the chamber;
      one or more inlets in fluid communication with the second volume;
      N outlets in fluid communication with the second volume, where N is an integer greater than one;
      N fans configured to create a second vacuum pressure in the second volume, to supply gas to the one or more inlets and to receive gas from a respective one of the N outlets; and
      N gas sensors configured to sense the trace gas mixture in the gas received from a respective one of the N outlets.

2. The leak detection system of claim 1, wherein the chamber support comprises one or more fans configured to create a first vacuum pressure in the first volume and to circulate the trace gas mixture within the first volume.

3. The leak detection system of claim 2, wherein the second vacuum pressure in the second volume is lower than the first vacuum pressure in the first volume.

4. The leak detection system of claim 1, wherein the trace gas mixture comprises an organic trace gas and an inert gas.

5. The leak detection system of claim 1, further comprising a gas sensor configured to sense the trace gas mixture circulated in the first volume.

6. The leak detection system of claim 5, wherein the gas sensor comprises a photo ionization detector.

7. The leak detection system of claim 1, wherein the N gas sensors comprise photo ionization detectors.

8. The leak detection system of claim 1, further comprising a controller configured to detect a leak in one or more of N regions of the test part in response to outputs of the N gas sensors and to identify a location of one or more leaks relative to the N regions.

9. The leak detection system of claim 1, wherein the adapter is removably attached to the second frame to allow replacement by another adapter for another test part having one or more dimensions that are different than the test part.

10. The leak detection system of claim 1, wherein:
   the test part support includes wheels to allow the test part support to move reciprocally below the chamber support in a horizontal direction from a loading/unloading position to a testing position, and
   the chamber support includes a position adjuster configured to reciprocally move the chamber in a vertical direction onto and off of the test part support.

11. A method for detecting leaks in a test part, comprising:
   arranging a test part on an adapter of a test part support;
   lowering a chamber mounted on a chamber support onto a seal plate of the test part support,
   wherein a first volume is defined between a first side of the test part and the chamber and a second volume is defined between a second side of the test part and the adapter;
   creating a first vacuum pressure in the first volume;
   creating a second vacuum pressure in the second volume;
   supplying a trace gas mixture to the first volume;
   supplying gas to one or more inlets in fluid communication with the second volume;
   sampling gas from N outlets in fluid communication with the second volume, where N is an integer greater than one, using N gas sensors; and
   identifying one or more leaks in one or more of N regions of the test part in response to outputs from the N gas sensors.

12. The method of claim 11, further comprising circulating the trace gas mixture within the first volume.

13. The method of claim 12, wherein the second vacuum pressure is lower than the first vacuum pressure.

14. The method of claim 11, wherein the trace gas mixture comprises an organic trace gas and an inert gas.

15. The method of claim 12, further comprising sensing the trace gas mixture circulated in the first volume.

16. The method of claim 15, wherein the sensing is performed using a photo ionization detector.

17. The method of claim 11, wherein the N gas sensors comprise photo ionization detectors.

18. The method of claim 11, further comprising removably attaching the adapter to a frame of the test part support to allow replacement of the adapter by another adapter configured for another test part having one or more dimensions different than the test part.

19. The method of claim 11, further comprising reciprocally moving the test part support in a horizontal direction below the chamber support.

20. The method of claim 11, further comprising reciprocally moving the chamber in a vertical direction onto the seal plate and off of the seal plate.

\* \* \* \* \*